United States Patent [19]

Shiraki et al.

[11] 4,164,531
[45] Aug. 14, 1979

[54] INJECTION MOLDING OF ULTRA HIGH MOLECULAR WEIGHT POLYETHYLENE

[75] Inventors: Takeshi Shiraki, Yamaguchi; Shozo Hieda, Otake; Tomokazu Ninomiya, Iwakuni, all of Japan

[73] Assignee: Mitsui Petrochemical Industries, Ltd., Tokyo, Japan

[21] Appl. No.: 858,834

[22] Filed: Dec. 8, 1977

Related U.S. Application Data

[63] Continuation of Ser. No. 645,437, Dec. 30, 1975, abandoned.

[30] Foreign Application Priority Data

Jan. 13, 1975 [JP] Japan ................................. 50-5611

[51] Int. Cl.² .......................... B29C 5/02; B29F 1/00; B29F 5/00
[52] U.S. Cl. .................................... 264/115; 264/328
[58] Field of Search .................... 264/6, 328, 329, 13, 264/294, 328, 329, 109, 115, 5

[56] References Cited

U.S. PATENT DOCUMENTS

| 3,036,340 | 5/1962 | Waddell | 264/328 |
| 3,134,830 | 5/1964 | Roelen | 264/294 |
| 3,660,552 | 5/1972 | Hinz et al. | 264/328 |

FOREIGN PATENT DOCUMENTS 40-1664 1/1965 Japan ........................................ 264/328

Primary Examiner—W. E. Hoag
Attorney, Agent, or Firm—Cooper, Dunham, Clark, Griffin & Moran

[57] ABSTRACT

Process for injection molding ultra high molecular weight polyethylene by injecting the ultra high molecular weight polyethylene into a cavity having a volume 1.5–3.0 times that of the injected polyethylene at a shear rate of at least 50,000 sec.$^{-1}$ measured at the gate of the injection nozzle and then compressing the cavity to a volume less than 1.5 times that of the injected polyethylene.

6 Claims, 5 Drawing Figures

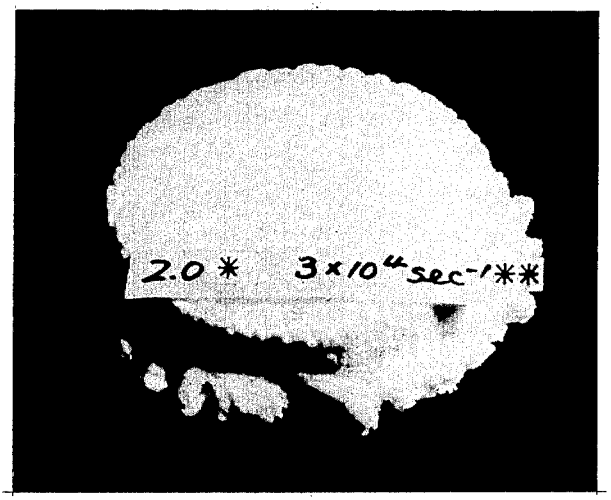
FIG. 3
FIG. 4
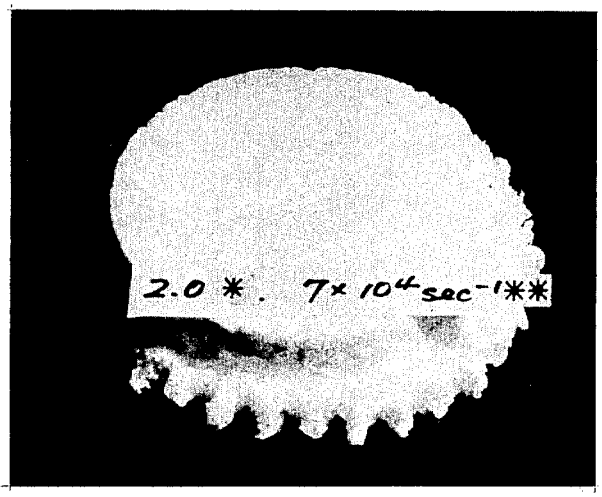
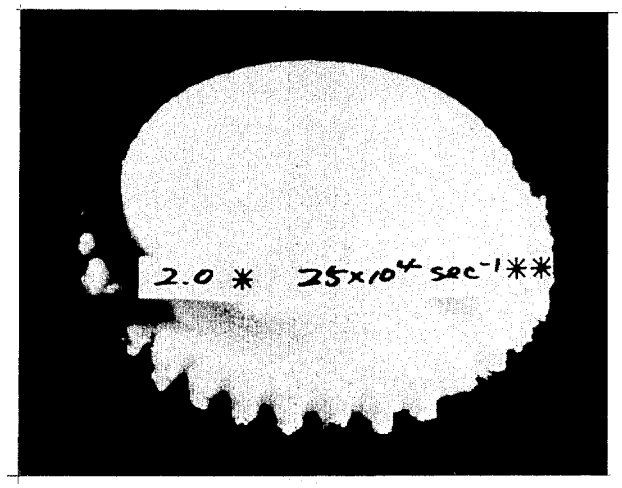
FIG. 5
\* TWICE VOLUME OF ORIGINAL POLYETHYLENE
\*\* SHEAR RATE

INJECTION MOLDING OF ULTRA HIGH MOLECULAR WEIGHT POLYETHYLENE

This application is a continuation of application Ser. No. 645,437, filed Dec. 30, 1975, and now abandoned.

BACKGROUND OF THE INVENTION

1. Field of the Invention

This invention relates to a process for injection molding ultra high molecular weight polyethylene.

2. Description of the Prior Art

In general, ultra high molecular weight polyethylene has excellent impact strength, abrasion resistance, self lubrication properties, and chemical resistance and is becoming more widely used for many purposes.

However, its melt viscosity is very high and its fluidity is poor compared with other widely used resins. Therefore, it is very difficult to shape ultra high molecular weight polyethylene by extrusion or injection molding. As a result it has conventionally been shaped by compression molding, the working efficiency of compression molding is so low that the art has long sought an injection molding method with a short molding cycle and high efficiency.

When ultra high molecular weight polyethylene is shaped by using conventional injection molding techniques, melt fracture occurs during filling the polyethylene into the mold cavity and the product is formed into easily peelable, mica like layers. Additionally, the molten polyethylenes, which are joined in the mold, often are not completely fused and this causes block breaking. Polyethylene injected through a conventional nozzle does not form continuous strands as with the usual resins. Instead it forms powders by flashing as it is charged in the mold with the result that often deaeration is not satisfactorily completed. Therefore, the thus molded product fails to show the excellent properties inherent in ultra high molecular weight polyethylene, and is inferior in such mechanical properties as tensile strength, impact strength, abrasion resistance and the like compared with conventional polyethylene products.

Various methods have been proposed for obtaining good products from resins of a high melt viscosity by injection molding, but when such methods are applied to ultra high molecular weight polyethylene the results are not always satisfactory. For example, the above mentioned drawbacks such as layer-like peeling, poor fusion and insufficient deaeration are improved, to some extent, by the process of heating the mold to a high temperature upon injection and cooling after injection. However, the improvements are not sufficient to permit the production of quality products. Additionally, the method requires a long molding cycle and is, therefore, unsatisfactory from an economical point of view. It has also been proposed to reduce the cavity volume of the mold after injection of the high polymer. For example, Japanese Patent Publication No. 1664/1965 and Japanese Patent Laid-Open-to-Public No. 43047/1972, describe such process. But the procedures are not effective for the production of high quality ultra high molecular weight polyethylene products.

When the polymer is injected into a mold cavity of a volume slightly larger than a volume of the final molded article at a shear rate obtained with conventional injection nozzles used for injection molding of polymers, and the cavity volume is then reduced to the selected volume, the resulting molded article is mica like in appearance and easily separable into layers.

Porous molded articles of ultra high molecular weight polyethylene can be manufactured by sintering a powder material, but the working efficiency is so low that the method is not suitable for mass production.

SUMMARY OF THE INVENTION

The present invention provides a process for injection molding ultra high molecular weight polyethylene which comprises injecting the polyethylene into a mold cavity having a volume 1.5–3.0 times that of the injected polyethylene at a shear rate of at least 50,000 sec.$^{-1}$ measured at the gate of the injection nozzle, and then compressing the mold cavity to a volume less than 1.5 times that of the injected polyethylene.

An object of the present invention is to provide a process for injection molding ultra high molecular weight polyethylene which has been heretofore regarded as substantially impossible.

Another object of the present invention is to provide a process for injection molding an ultra high molecular weight polyethylene to produce non-porous or porous shaped articles.

BRIEF DESCRIPTION OF THE DRAWING

FIG. 3, FIG. 4 and FIG. 5 show photographs of products produced by injecting ultra high molecular weight polyethylene into a gear-like mold having an initial cavity volume twice that of the injected polyethylene, and solidifying.

DESCRIPTION OF THE PREFERRED EMBODIMENT

Figure 1:
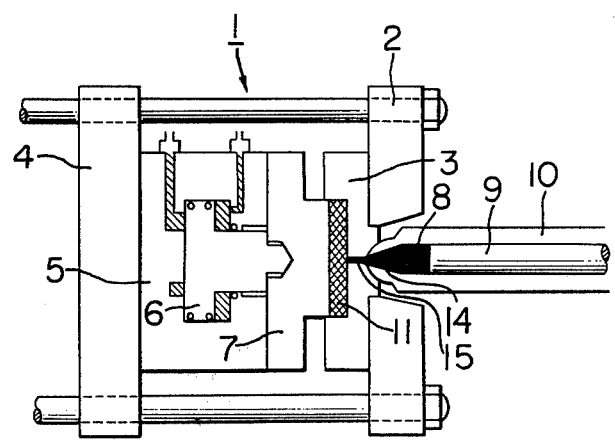
FIG. 1 and FIG. 2 show diagrammatically an injection molding apparatus of the type used in the invention.

Ultra high molecular weight polyethylene has a molecular weight for higher than usual polyethylene for molding and is particularly characterized by its difficult molding characteristics. It may be produced by Ziegler polymerization.

The present invention is useful with all of the ultra high molecular weight polyethylene, especially ultra high molecular weight polyethylene having an intrinsic viscosity [$\eta$] measured in decalin at 135° C. of 3–30. In fact it is useful with polyethylene having an intrinsic viscosity [$\eta$] of 10–30 and melt index (MI$_{20}$) of up to 0.01.

The injection temperature is not critical, as long as it is at least higher than the melting point of the ultra high molecular weight polyethylene and lower than its decomposition temperature.

Ultra high molecular weight polyethylenes having MI$_{20}$ value up to 0.01 have remarkably low fluidity in the molten state, and the fluidity is not changed appreciably with changes in temperature. Therefore, in general, a fairly wide range of injection temperatures, for example, from 140° to 300° C. for intrinsic viscosity of 3–30, and from 150° to 300° C. for intrinsic viscosity of 10–30, may be employed.

With polyethylenes having intrinsic viscosity of from 3 to 10, the preferred temperature range is from 140° to 200° C. It has been observed that at a high injection temperatures the melt fluidity of the polyethylene increases to the point where it sometimes becomes difficult to fill the mold cavity with finely divided and uniform powder-like molten polyethylene.

The material to be molded in accordance with the present invention is in a molten state, but in a state of relatively low fluidity as it passes through the injection nozzle and the gate into the mold cavity. As a result, the shear rate at the injection nozzle is at least 50,000 sec$^{-1}$. The range is typically from 50,000 to 1,000,000 sec$^{-1}$. It is preferred that the shear rate is from 200,000 to 500,000 sec$^{-1}$.

For nozzles with a circular cross section, the shear rate may be determined from the following formula:

$$\dot{\gamma} = 4Q/\pi r^3$$

where $\dot{\gamma}$ is shear rate in (sec.$^{-1}$), Q is the injected amount of the polyethylene expressed in (cc./sec.), and r is a radius of the cross section of the injection nozzle in centimeters.

According to the above formula, a desired shear rate can be obtained by appropriately selecting the size of nozzle and the injection velocity.

In accordance with the present invention, it has been discovered that ultra high molecular weight polyethylene may be flashed into the mold to fill the whole cavity with powder like polyethylene in a finely divided form and a uniform size by keeping the shear rate at the above mentioned defined level. The products produced by the process of the invention have a smooth surface and improved mechanical properties, particularly impact strength.

In contrast, when the same materials are injected at a shear rate lower than 50,000 sec.$^{-1}$, as in conventional injection molding, the molten ultra high molecular weight polyethylene which fills mold in the form of strands or blocks of a relatively large size. As a result, it is difficult to distribute the molten polyethylene uniformly throughout the cavity, particularly, into the extremities of the mold, and into the smaller sections of the cavity. The resulting molded articles have portions which are not fully shaped, and rough surfaces. It is difficult to produce articles with acceptable appearance and good mechanical properties. The cavity volumes of molds used in this invention are from 1.5–3.0 times (based on normal temperature) the volume of the injected polyethylene. This accelerates flashing of the injected molten polyethylene in a finely divided powder form, and permits uniform distribution of the polyethylene powder in the cavity. Promptly after completion of injection, the cavity volume is reduced to a volume less than 1.5 times that of the injected polyethylene, preferably the mold cavity volume is reduced to a volume less than 1.5 times that of the injected polyethylene, immediately after injection for commercial reasons to insure good production rates. However, there is no disadvantage either in the process or in the resulting products if the polyethylene is retained in the molten state for a short time after injection, say for example, up to one minute or more.

When the compression is completed, the polyethylene powder is fused and integrated into a hard molded article accurately reproducing the shape of the mold, having a smooth surface, and good mechanical properties.

In order to effect deaeration most efficiently, it is best that the compression pressure be at least 5 Kg./cm$^2$. It may be as high as 1000 Kg./cm$^2$.

In accordance with this invention, when the original mold volume is from 1.5–3.0 times the volume of the polethylene, and compression is effected to the point where the mold volume is substantially equal to the volume of the polyethylene, the products formed are non-porous. When the final mold volume is larger than the original volume of polyethylene, for example less than 1.5 but more than 1.1 times that value, the products formed are porous.

Figure 2:
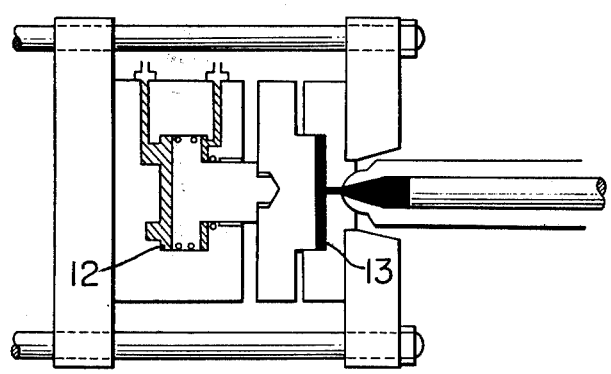

Any conventional mold with a direct pressure mold clamping system may be used. If a toggle type mold clamping system is employed, one having an assisting mold used for the compression as shown in FIG. 1 and FIG. 2 is preferable. The molding operation is effected by weighing an amount of ultra high molecular weight polyethylene corresponding to the amount of the desired product and injecting the measured polyethylene into a cavity of the volume of 1.5–3.0 times, preferably 1.7–2.5 times the product volume at a shear rate of at least 50,000 sec.$^{-1}$, preferably not less than 200,000 sec.$^{-1}$ at the injection nozzle.

If the cavity volume is smaller than the above mentioned volume, plug flow of the polyethylene is hindered by the surface of the mold and causes a laminer flow behavior so that the resulting product has the mica like characteristics referred to above. On the other hand, if the cavity volume is larger than that mentioned above, some portions of the mold are not filled.

After the completion of filling the polyethylene in the cavity, the cavity volume is immediately reduced to the desired volume by compression and the molding operation is completed. Since the injection and the compression are conducted within a short time, an article of uniform property can be obtained even at a low cavity temperature.

The ultra high molecular weight polyethylene used in the present invention may be compounded with other conventional ingredients. Examples of such components are anti-oxidants of the phenol series, heat-stabilizer of the organic sulfur series, lubricants such as fatty acid soaps and amides, fillers such as silica, calcium carbonate, fired clay and the like, and various organic or inorganic pigments.

The molded articles obtained by the process of this invention are useful for various machine parts, filters, casings, containers, and domestic articles.

The following examples are given for the purpose of illustration and not by way of limitation.

EXAMPLE 1 AND COMPARISON EXAMPLE 1

FIG. 1 shows an injection molding apparatus after the high molecular weight polyethylene is injected while FIG. 2 shows the same after compression.

A fixed mold 3 having an injection nozzle 14 with a gate 15 is fixed to a fixing plate 2 of a mold opening and closing mechanism 1. A moving plate 4 has a primary moving mold 5 possessing an oil pressure piston cylinder (not shown) and a secondary moving mold 7 connected with a piston 6. The secondary moving mold 7 and the fixed mold 3 constitute a pair of separable molds.

8 denotes a molten ultra high molecular weight polyethylene (trade name, Hi-zex Million, MI$_{20}$ not higher than 0.01, [$\eta$] decalin 135° C. = 18, melting point 136° C., supplied by Mitsui Petrochemical Industries Ltd.), 9 denotes a plunger for injection, 10 denotes a heating cylinder and 11 denotes the above mentioned molten ultra high molecular weight polyethylene of low bulk density filled in the mold cavity through the injection nozzle.

In FIG. 2, 12 denotes the oil from the oil pressure unit for moving the secondary moving mold 7 and 13 denotes the molten polyethylene compressed, fused and deaerated by the secondary moving molding.

An injection is effected at a molten resin temperature of 250° C. and a mold temperature of 70° C. of the injection unit with a shear rate of the resin passing through the injection nozzle and a mold cavity volume upon the injection as shown in Table 1. After the completion of injection, the secondary moving mold is driven to compress at a pressure of 100 Kg./cm² until the cavity volume becomes the same, as that of the injected polyethylene. The polyethylene is cooled for 3 minutes, and there is produced a gear-like injection molded article 144 mm, in outer diameter, 13 mm, in pitch, 7.5 mm, in full depth and 15 mm, in thickness. The physical properties are shown in Table 1.

Now referring to FIGS. 3–5 of photographs, for comparing the filling state of the resin in the mold when injected, photographs of injected resins cooled and solidified without compression are illustrated in FIG. 3, FIG. 4 and FIG. 5. In each case the cavity volume is twice the volume of the injected resin. The shear rates at the injection nozzle in FIG. 3, FIG. 4 and FIG. 5 are 30,000 sec.$^{-1}$, 70,000 sec.$^{-1}$, and 250,000 sec.$^{-1}$, respectively.

As is clear from results reported in Table 1, and from the photographs in the drawing, the article in FIG. 3 has a poor filling state at the top of the teeth, and therefore the impact strength at that section is very low, but the articles in FIG. 4 and FIG. 5 have good filling states and each of the compressed articles shows a high impact strength at the top of tooth.

Table 1

| | Molding conditions | | Characteristics of Product | | | | |
| --- | --- | --- | --- | --- | --- | --- | --- |
| | | | Impact strength (1) | | Appearance | | |
| | Shear rate of injection nozzle sec.$^{-1}$ | Mold cavity volume per injected resin volume | top of tooth | Center portion | Filling state of top of tooth (2) | Layer-like peeling (3) | Surface state (4) |
| Example 1 | 2.5 × 10⁵ | 1.6 | 128 | 124 | O | O | O |
| | " | 2.0 | 134 | 130 | O | O | O |
| | " | 2.8 | 130 | 132 | O | O | O |
| | 7 × 10⁴ | 1.7 | 110 | 118 | O | O | O |
| | " | 2.0 | 118 | 126 | O | O | O |
| | " | 2.5 | 110 | 127 | O | O | Δ |
| Comparison Example 1 | 2.5 × 10⁵ | 1.4 | 110 | 80 | O | Δ | O |
| | " | 3.2 | 94 | 120 | Δ | O | O |
| | 7 × 10⁴ | 1.4 | 91 | 83 | O | X | O |
| | " | 3.2 | 86 | 120 | X | O | Δ |
| | 3 × 10⁴ | 1.4 | 40 | 71 | O | X | X |
| | " | 1.6 | 39 | 90 | Δ | X | X |
| | " | 2.0 | 32 | 108 | Δ | Δ | X |
| | " | 2.5 | 24 | 115 | X | O | X |

(1) Measured according to ASTM D 256
(2) Judged of a product solidified without compression
O: good to of tooth
X: top of tooth is absent
Δ: between O and X
(3) O: no peeling
Δ: only the surface layer is peeled
X: peeled to a great extent
(4) O: very smooth with lustre
Δ: somewhat rough
X: having unevenness

EXAMPLE 2 AND COMPARISON EXAMPLE 2

Repeating the procedure of Example 1 except that the mold temperature is 25° C. and the compression is made up to 1.3 times the volume of injected resin, there is obtained a porous gear 20 mm. thick.

The characteristics and appearance are reported in Table 2.

Table 2

| | Molding conditions | | Characteristics of Product | | |
| --- | --- | --- | --- | --- | --- |
| | Shear Rate at injection nozzle sec.$^{-1}$ | Mold cavity volume per injected resin volume | Impact strength* (Center-portion) Kgcm/cm² | Appearance | |
| | | | | Shape of tooth top** | Layer-like peeling* |
| Example 2 | 2.5 × 10⁵ | 1.6 | 24 | O | O |
| | " | 2.0 | 27 | O | O |
| | " | 2.8 | 22 | O | O |
| | 7 × 10⁴ | 1.7 | 15 | O | O |
| | " | 2.0 | 22 | O | O |
| | " | 2.5 | 20 | O | O |
| Comparison Example 2 | 2.5 × 10⁵ | 1.4 | 10 | O | Δ |
| | " | 3.2 | 22 | Δ | O |
| | 7 × 10⁴ | 1.4 | 5 | O | X |
| | " | 3.2 | 8 | X | O |
| | 3 × 10⁴ | 1.4 | 3 | O | X |
| | " | 1.6 | 3 | Δ | X |
| | " | 2.0 | 7 | Δ | Δ |

Table 2-continued

| Molding conditions | | Characteristics of Product | | |
| --- | --- | --- | --- | --- |
| Shear Rate at injection nozzle sec.$^{-1}$ | Mold cavity volume per injected resin volume | Impact strength* (Center-portion) Kgcm/cm$^2$ | Appearance | |
| | | | Shape of tooth top** | Layer-like peeling* |
| " | 2.5 | 5 | X | O |

*The same as in Table 1.
**O: Good top of tooth.
Δ: Tops of teeth are partly broken.
X: Tops of teeth are broken to a great extent.

We claim:

1. A process for injection molding of ultra high molecular weight polyethylene having an intrinsic viscosity of 10 to 30 when measured in decalin at 135° C. and a melt index of up to 0.01 which comprises injecting the polyethylene into a mold cavity having a volume of 1.7 to 2.5 times that of the injected polyethylene at a shear rate of from 200,000 to 500,000 sec$^{-1}$ measured at the gate of the injection nozzle at a temperature of from 150° C. to 300° C. to form powder particles and reducing the mold cavity volume to less than 1.5 times that of the injected polyethylene to compress and unite the powder particles and form a coherent molded product.

2. A process for injection molding of ultra high molecular weight polyethylene having an intrinsic viscosity of from 3 to 30 when measured in decalin at 135° C. and a melt index up to 0.01 which comprises injecting the polyethylene into a mold cavity having a volume of 1.5 to 3.0 times that of the injected polyethylene at a shear rate of from 50,000 sec.$^{-1}$ to 1,000,000 sec.$^{-1}$ measured at the gate of the injection nozzle at a temperature of from 140° C. to 300° C. to form powder particles, and then decreasing the mold cavity volume to less than 1.5 times that of the injected polyethylene to compress and unite the powder particles and form a coherent molded product.

3. A process according to claim 2 in which the cavity volume is compressed to a volume of less than 1.5 times, but not less than 1.1 times that of the injected polyethylene.

4. A process according to claim 2 in which the shear rate is from 200,000 to 500,000 sec.$^{-1}$.

5. A process according to claim 2 in which the volume of the cavity is 1.7–2.5 times that of the injected polyethylene.

6. A process according to claim 2 in which the ultra high molecular weight polyethylene has an intrinsic viscosity $\eta$ measured at 135° C. in decalin of 10–30 and a melt Index (MI$_{20}$) of up to 0.01.

* * * * *